(12) United States Patent
Morris et al.

(10) Patent No.: US 12,253,105 B2
(45) Date of Patent: Mar. 18, 2025

(54) USE OF AN OVERSIZED THREADED ROD IN A LOCKING OBLONG HOLE

(71) Applicant: Hilti Aktiengesellschaft, Schaan (LI)

(72) Inventors: Nicholas Morris, Feldkirch (AT); Raphael Thon, Feldkirch (AT); Philip Richardson, Feldkirch (AT)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 18/007,150

(22) PCT Filed: Jul. 20, 2021

(86) PCT No.: PCT/EP2021/070241
§ 371 (c)(1),
(2) Date: Jan. 27, 2023

(87) PCT Pub. No.: WO2022/023120
PCT Pub. Date: Feb. 3, 2022

(65) Prior Publication Data
US 2023/0228285 A1 Jul. 20, 2023

(30) Foreign Application Priority Data
Jul. 30, 2020 (EP) ..................................... 20188624

(51) Int. Cl.
*F16B 5/00* (2006.01)
*E04B 1/24* (2006.01)
*F16B 39/284* (2006.01)

(52) U.S. Cl.
CPC .......... *F16B 5/0036* (2013.01); *E04B 1/2403* (2013.01); *F16B 39/284* (2013.01);
(Continued)

(58) Field of Classification Search
CPC ...... F16B 5/0225; F16B 5/025; F16B 5/0036; F16B 39/284; F16B 4/004; F16B 5/02;
(Continued)

(56) References Cited

U.S. PATENT DOCUMENTS

| 4,754,857 A | * | 7/1988 | Urban ..................... F16D 51/20 |
| | | | 188/205 R |
| 4,911,386 A | * | 3/1990 | Putman ............... B60R 11/0205 |
| | | | 455/345 |

(Continued)

FOREIGN PATENT DOCUMENTS

| GB | 174000 A | 12/1912 |
| JP | 2016-513217 A | 5/2016 |

OTHER PUBLICATIONS

PCT/EP2021/070241, International Search Report dated Sep. 22, 2022 (Two (2) pages).

*Primary Examiner* — Sarang Afzali
*Assistant Examiner* — Darrell C Ford
(74) *Attorney, Agent, or Firm* — Crowell & Moring LLP

(57) ABSTRACT

A method for securing a first part to a second part where the first part has a locking oblong hole. The method includes passing a locking threaded rod through the locking oblong hole and into the second part. The locking threaded rod is oversized with respect to a width of the locking oblong hole such that the locking threaded rod widens the locking oblong hole as the locking threaded rod is passing through the locking oblong hole.

3 Claims, 3 Drawing Sheets

(52) U.S. Cl.
CPC ............... *E04B 2001/2418* (2013.01); *E04B 2001/2439* (2013.01)

(58) Field of Classification Search
CPC ........... E04B 1/2403; E04B 2001/2418; E04B 2001/2439; F16M 13/022; F21V 21/14
USPC .. 248/544, 669, 670, 220.21, 222.14, 224.8, 248/225.11, 274.1, 298.1
See application file for complete search history.

(56) References Cited

U.S. PATENT DOCUMENTS

| | | | |
|---|---|---|---|
| 5,093,976 A | 3/1992 | Malinow et al. | |
| 6,837,009 B1 * | 1/2005 | Roth | F16B 9/05 24/563 |
| 7,888,595 B2 * | 2/2011 | Guttinger | F25D 23/006 174/53 |
| 8,523,119 B1 * | 9/2013 | Greer | E03D 11/143 248/65 |
| 8,555,592 B2 * | 10/2013 | Daudet | E04B 2/768 52/489.1 |
| 10,544,895 B2 | 1/2020 | Chinn et al. | |
| 10,724,229 B2 * | 7/2020 | Daudet | E04B 1/388 |
| 2009/0065232 A1 * | 3/2009 | Guttinger | F16B 5/02 174/51 |
| 2015/0003931 A1 * | 1/2015 | Fischer | F16L 23/14 411/366.3 |

* cited by examiner

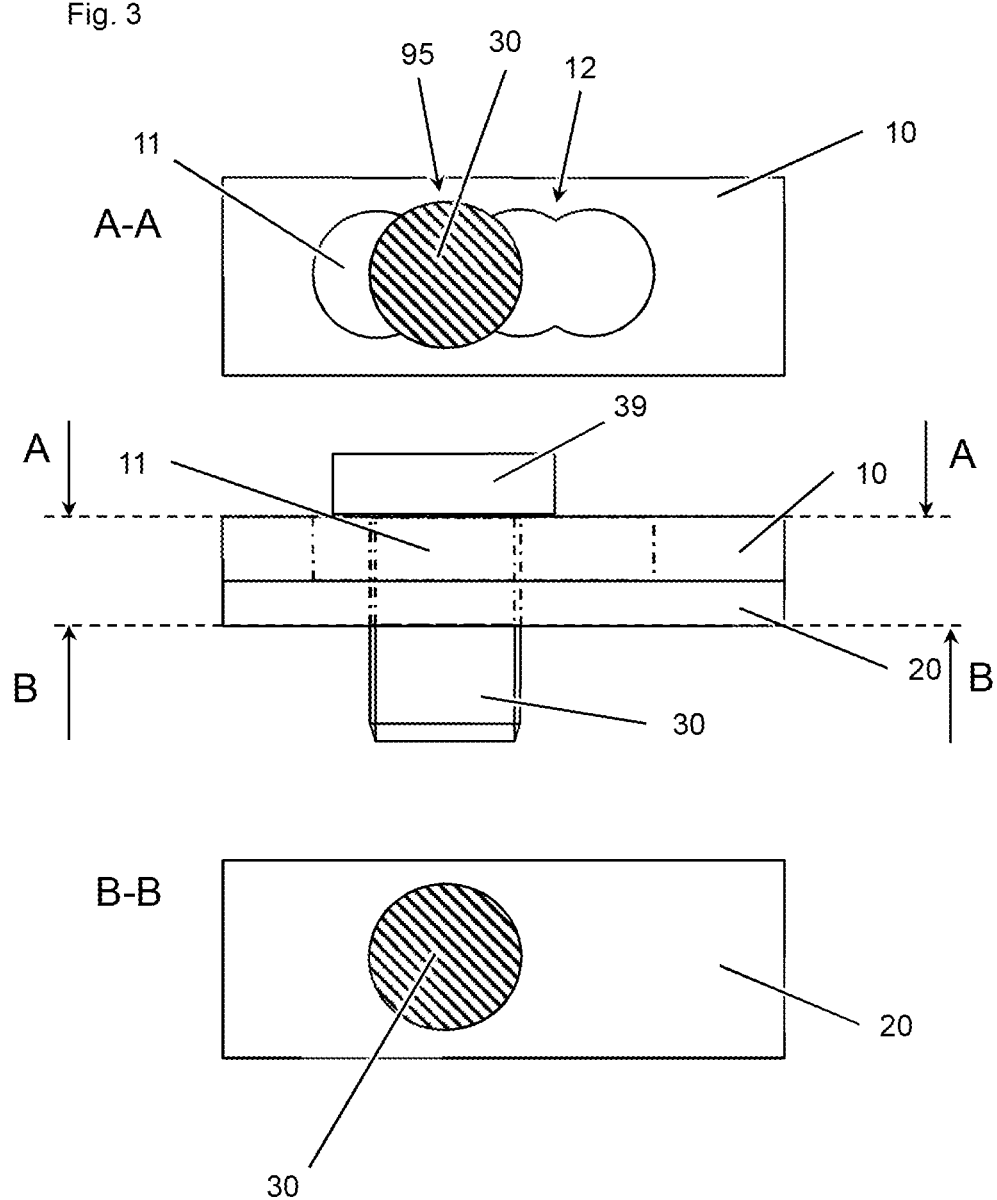

USE OF AN OVERSIZED THREADED ROD IN A LOCKING OBLONG HOLE

BACKGROUND AND SUMMARY OF THE INVENTION

The invention relates to a method for securing a first part, which is provided with a locking oblong hole, to a second part. The invention also relates to an arrangement which can be obtained using the method and to an installation set that can be used for performing the method.

It is an object of the invention to provide a particular efficient mechanism for securing the first part on the second part in a height-adjustable manner.

The invention teaches a method for securing a first part, which is provided with a locking oblong hole, to a second part, the method comprising passing a locking threaded rod through the locking oblong hole into the second part, characterized in that
the locking threaded rod is oversized with respect to the width of the locking oblong hole, so that the locking threaded rod widens the locking oblong hole as it is passed through the locking oblong hole.

Accordingly, an oversized locking threaded rod is passed through the locking oblong hole, which locking threaded rod widens the locking oblong hole during this process, thereby creating an undercut width maximum, in particular a global width maximum, within the locking oblong hole, in which the locking threaded rod correspondingly engages. This can provide particularly tight fixation in a particular efficient manner—not only by the positive engagement, but also by an interlock at geometrical formations which are formed by material that is displaced in the widening process.

At least the thread of the threaded rod is oversized with respect to the width of the locking oblong hole, i.e., the major diameter is oversized. Preferably, also the shank of the threaded rod is oversized with respect to the width of the locking oblong hole, i.e., the minor diameter is oversized.

It is particularly preferred that the locking oblong hole has at least one constriction, which is, in particular, already present before the locking threaded rod is passed through the locking oblong hole. The locking oblong hole has thus a cloud-like outline. This can assist to position the threaded rod, further facilitating the method.

Preferentially, the method comprises passing the locking threaded rod through the locking oblong hole that is provided within the first part into a circular hole in the second part. Accordingly, the second part has a circular hole at the beginning of the method, which circular hole subsequently receives the locking threaded rod. This can further facilitate the method.

The locking threaded rod can be oversized also with respect to the diameter of the circular hole, so that the locking threaded rod enlarges the diameter of the circular hole as it is passed into the circular hole. In particular, the locking threaded rod can threadedly tap the wall of the circular hole as it is passed into the circular hole. This can provide particular good engagement with the second part.

The locking threaded rod is, advantageously, headed, i.e., a screw head is provided thereon. This can further improve the connection.

According to another preferential embodiment:
the first part has a pre-fixing oblong hole, and
before the locking threaded rod is passed through the locking oblong hole into the second part, the first part is pre-fixed on the second part by means of passing a pre-fixing threaded rod through the pre-fixing oblong hole into the second part,
wherein the pre-fixing threaded rod is undersized with respect to the width of the pre-fixing oblong hole, so that the pre-fixing threaded rod does not widen the pre-fixing oblong hole as it is passed through the pre-fixing oblong hole.

Accordingly, a pre-fixing is applied, in which the respective pre-fixing oblong hole is not widened. This embodiment is based on the finding that the widening process of the locking oblong hole tends lift the first part off the second part, and material accumulations might occur in-between these parts, which accumulations might prevent close-fitting securement at a later stage. The described pre-fixing can efficiently counteract this process, since it provides close-fitting securement before material is displaced in the widening process. Moreover, the pre-fixing can also allow for particularly easy adjustment and/or can improve load transfer capability.

The locking threaded rod and the pre-fixing threaded rod have preferentially generally identical dimensions. This can further facilitate the process, since only a single type of threaded rods needs to be stocked and since no confusion of the rods is possible.

The pre-fixing threaded rod is preferably headed, i.e., a screw head is provided thereon. This can further improve the connection.

At least one of the first part and the second part can be a metal part, in particular a steel part. At least one of the locking threaded rod and the pre-fixing threaded rod can be a metal part, in particular a steel part. It is particularly preferred that the first part is a bracket and the second part is a girder, in particular hollow box-profile girder. The tight height adjustment mechanism provided by the invention is particularly suitable for this application.

The invention also relates to an arrangement which can be obtained using the method, comprising a first part, which is provided with a locking oblong hole, a second part and a locking threaded rod that penetrates through the locking oblong hole into the second part, wherein the locking oblong hole has a global width maximum, in particular a strict global width maximum, where the locking threaded rod penetrates through the locking oblong hole. Accordingly, the locking oblong hole has been widened by the locking threaded rod as intended. In particular, the locking oblong hole can have internal screw thread structures in its wall at the global width maximum of the locking oblong hole, which internal screw thread structures mate with the external thread of the locking threaded rod, wherein the external thread of the locking threaded rod engages the internal thread structure. In particular, the internal screw thread structures have been tapped by the locking threaded rod. At the global width maximum, the locking oblong hole has maximum width throughout the locking oblong hole. According to usual definition, width can be considered to be the short dimension of the respective oblong hole and length the long dimension thereof.

The invention also relates to an installation set that can be used for performing the method. In particular, the invention set can comprise a first part, which is provided with a locking oblong hole and with a pre-fixing oblong hole, a locking threaded rod and a pre-fixing threaded rod, wherein the locking threaded rod and the pre-fixing threaded rod have generally identical dimensions, wherein the locking threaded rod is oversized with respect to the width of the locking oblong hole, so that the locking threaded rod widens the locking oblong hole as it is passed through the locking oblong hole. Preferably, the pre-fixing threaded rod is undersized with respect to the width of the pre-fixing oblong hole, so that the pre-fixing threaded rod does not widen the pre-fixing oblong hole as it is passed through the pre-fixing oblong hole.

Features that are described here in connection with the method can also be used in connection with the arrangement and/or the installation set, features that are described here in connection with the arrangement can also be used in connection with the method and/or the installation set, and features that are described here in connection with the installation set can also be used in connection with the method and/or the arrangement.

The invention is explained in greater detail below with reference to preferred exemplary embodiments, which are depicted schematically in the accompanying drawings. Individual features of the exemplary embodiments presented below can be implemented either individually or in any combination within the scope of the present invention.

BRIEF DESCRIPTION OF THE DRAWINGS

FIG. 3 is a highly schematic detail view of the system of FIG. 1, at a stage after the locking threaded rod has been passed through the parts of the arrangement, in sectional view A-A, side view and sectional view B-B. In this state, the system can be also referred to as "arrangement".

DETAILED DESCRIPTION OF THE DRAWINGS

Figure 1:
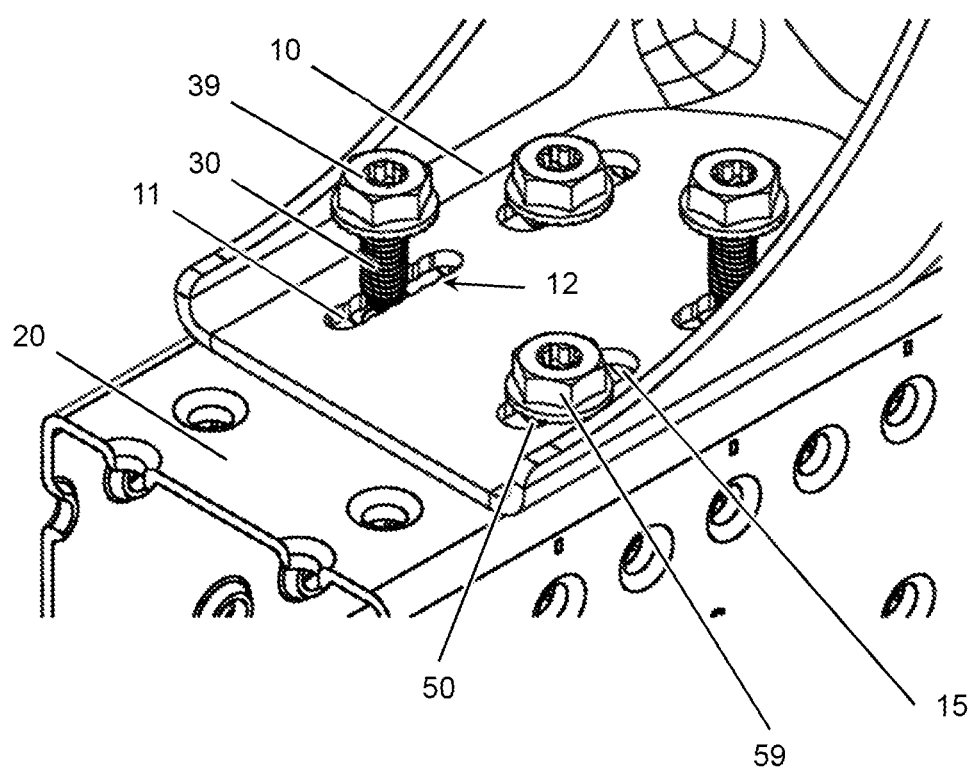
FIG. 1 is an isometric view of a system comprising a first part and a second part which is used in a method for securing the first part to the second part.

The figures show a system comprising a first part 10, which is, by way of example, an angle bracket, and a second part 20, which is, by way of example, a girder, preferably a hollow metal girder.

The first part 10 comprises a locking oblong hole 11. The locking oblong hole 11 is a through hole, which penetrates through the first part 10, and in accordance with the usual understanding of an oblong hole, it is longer than it is wide. The locking oblong hole 11 is provided with constrictions 12, which form local narrowings of the width of the locking oblong hole 11 for centring a threaded rod.

The first part 10 furthermore comprises a pre-fixing oblong hole 15. The pre-fixing oblong hole 15 is a through hole, which penetrates through the first part 10, and in accordance with the usual understanding of an oblong hole, it is longer than it is wide. In contrast to the locking oblong hole 11, the pre-fixing oblong hole 15 preferably does not have constrictions 12.

The pre-fixing oblong hole 15 has a greater maximum width than has the locking oblong hole 11.

The system furthermore comprises a locking threaded rod 30 and a pre-fixing threaded rod 50. Both the locking threaded rod 30 and the pre-fixing threaded rod 50 are externally threaded, wherein the thread dimensions of the locking threaded rod 30 and the pre-fixing threaded rod 50 are generally the same. The locking threaded rod 30 is provided with a screw head 39 and the pre-fixing threaded rod 50 with a screw head 59.

As can be taken from FIG. 1, additional oblong holes and additional threaded rods might also be provided.

In an embodiment of a method for securing the first part 10 on the second part 20, the first part 10 is initially positioned adjacent to the second part 20.

Subsequently, the pre-fixing threaded rod 50 is passed through the pre-fixing oblong hole 15 and screwed into the second part 20. In particular, the pre-fixing threaded rod 50 can be tappingly screwed into a corresponding circular hole provided in the second part 20. The pre-fixing threaded rod 50 is tightened until its screw head 59 secures the first part 10 on the second part 20. The resulting state is shown in FIG. 1. The pre-fixing threaded rod 50 is undersized with respect to the pre-fixing oblong hole 15, and the pre-fixing threaded rod 50 generally does not widen the pre-fixing oblong hole 15 as it is passed therethrough.

Figure 2:
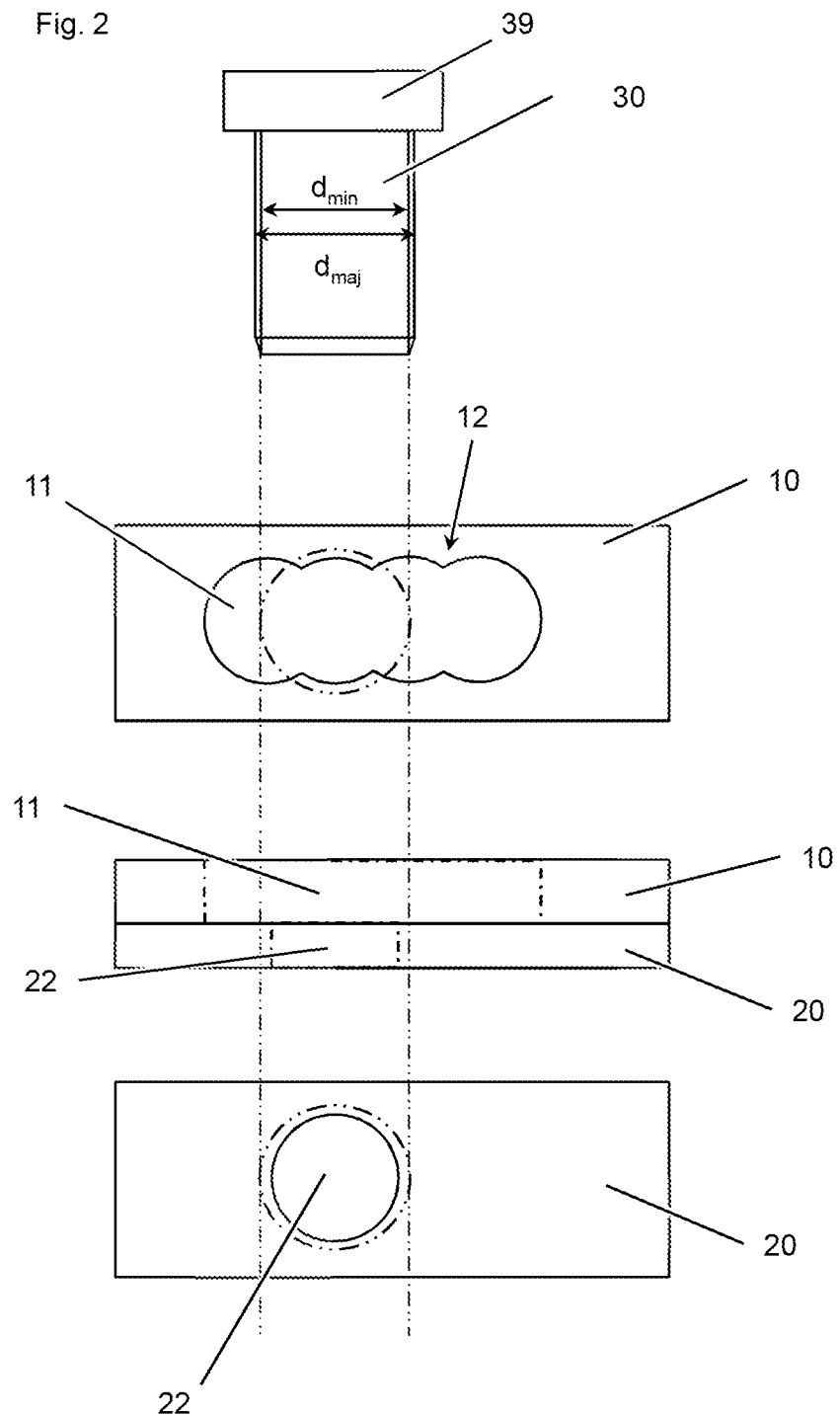
FIG. 2 is a highly schematic detail view of the system of FIG. 1, at a stage before the locking threaded rod is passed through the parts of the arrangement, in top view, side view and bottom view. The dot dashed lines are projections of the locking threaded rod. In this state, the system can be also referred to as "installation set"

Subsequently the locking threaded rod 30 is screwingly passed through the locking oblong hole 11 and screwed into the second part 20. In particular, the locking threaded rod 30 can be tappingly screwed into a circular hole 22 provided in the second part 20. The locking threaded rod 30 is tightened until its screw head 39 hits the first part 10. FIG. 2 shows the system before the above-mentioned this process, FIG. 1 shows the system during this process, and FIG. 3 shows the system at the end of this process. The locking threaded rod 30 is oversized with respect to the locking oblong hole 11. In the present embodiment, both the major diameter $d_{maj}$ and the minor diameter $d_{min}$ of the locking threaded rod 30 are oversized with respect to the locking oblong hole 11, but an embodiment in which only the major diameter $d_{maj}$ is oversized with respect to the locking oblong hole 11 could also be envisaged as an alternative. Since the locking threaded rod 30 is oversized with respect to the locking oblong hole 11, the locking threaded rod 30 threadedly cuts into the hole walls of the locking oblong hole 11 and locally widens the locking oblong hole 11. Consequently, a global width maximum 95 is formed where the locking threaded rod 30 penetrates through the locking oblong hole 11. The locking threaded rod 30 engaging into the global width maximum 95 can provide particularly good lateral locking.

The locking threaded rod 30 is also oversized with respect to the circular hole 22. Therefore, the locking threaded rod 30 also widens the circular hole 22 as it is passed into the second part 20.

The locking oblong hole 11 could, for example, have a slot width of 7 mm if the wall strength of the first part 10 is 3 mm, and of 8 mm if the wall strength of the first part 10 is 4 mm. The locking oblong hole 11 can be used multiple times in different positions to allow repositioning. This can be assisted by the constrictions 12. The locking oblong hole 11 might have extension at its opposing ends, which counteract a tendency of the locking threaded rod 30 to move within the locking oblong hole 11 when cutting one of the opposing ends of the locking oblong hole 11 (i.e., when cutting not only the opposite walls of the locking oblong hole 11, but also one of its end walls).

The invention claimed is:

1. An installation set, comprising:
   a first part, wherein the first part has a locking oblong hole and has a pre-fixing oblong hole, wherein the locking oblong hole has a maximum width;
   a locking threaded rod; and
   a pre-fixing threaded rod,
   wherein the locking threaded rod is oversized with respect to the maximum width of the locking oblong hole such that the locking threaded rod and the locking oblong hole are configured such that passing the locking threaded rod through the locking oblong hole causes the locking threaded rod to engage and interlock the locking oblong hole and to widen the maximum width of the locking oblong hole.

2. The installation set of claim 1, wherein the pre-fixing threaded rod is undersized with respect to a width of the pre-fixing oblong hole such that the pre-fixing threaded rod does not widen the pre-fixing oblong hole when the pre-fixing threaded rod is passed through the pre-fixing oblong hole.

3. The installation set of claim 1, wherein the first part is a bracket.

* * * * *